（12）United States Patent
Miksic et al.

(10) Patent No.: US 7,048,873 B1
(45) Date of Patent: May 23, 2006

(54) COMPOSITION AND METHOD FOR REPAIRING METAL REINFORCED CONCRETE STRUCTURES

(75) Inventors: Boris A. Miksic, North Oaks, MN (US); Alla Furman, Shoreview, MN (US); Jessica Jackson, Hudson, WI (US)

(73) Assignee: Cortec Corporation, St. Paul, MN (US)

( * ) Notice: Subject to any disclaimer, the term of this patent is extended or adjusted under 35 U.S.C. 154(b) by 646 days.

(21) Appl. No.: 10/103,249

(22) Filed: Mar. 20, 2002

Related U.S. Application Data

(63) Continuation-in-part of application No. 09/861,906, filed on May 21, 2001, now Pat. No. 6,764,615.

(51) Int. Cl.
*C09K 3/00* (2006.01)

(52) U.S. Cl. ............. 252/388; 252/389.1; 252/389.61; 106/14.41; 106/14.42; 106/14.44; 106/727; 106/728; 427/140

(58) Field of Classification Search ............... 252/388, 252/389.1, 389.61; 106/14.41, 14.42, 14.44, 106/727, 728; 427/140
See application file for complete search history.

(56) References Cited

U.S. PATENT DOCUMENTS

| 5,427,819 | A | * | 6/1995 | Weyers et al. ............. 427/136 |
| 5,561,173 | A | | 10/1996 | Dry |
| 5,575,841 | A | | 11/1996 | Dry |
| 5,597,514 | A | * | 1/1997 | Miksic et al. ............. 252/390 |
| 5,660,624 | A | | 8/1997 | Dry |
| 5,750,053 | A | * | 5/1998 | Miksic et al. .......... 252/389.52 |
| 6,054,512 | A | | 4/2000 | Nelson et al. |
| 6,075,072 | A | | 6/2000 | Guilbert et al. |
| 6,764,615 | B1 | * | 7/2004 | Miksic et al. ............. 252/388 |

* cited by examiner

*Primary Examiner*—Cephia D. Toomer
(74) *Attorney, Agent, or Firm*—Haugen Law Firm PLLP

(57) ABSTRACT

A composition and method for repairing metal reinforced concrete structures by applying a repair coating to surfaces of such damaged structures. The coating composition is a mortar/aggregate mixture blended with fiber reinforcements and containing a quantity of selected migratory corrosion inhibitors. These inhibitors are a mixture of sodium gluconate together with an auxiliary inhibitor consisting of sodium sebacate, potassium sebacate or ammonium benzoate. The fiber reinforcements consist of polypropylene or polyethylene, and are co-extruded with a quantity of the migratory corrosion inhibitors listed above.

3 Claims, No Drawings

COMPOSITION AND METHOD FOR REPAIRING METAL REINFORCED CONCRETE STRUCTURES

CROSS-REFERENCE TO RELATED APPLICATION

The present application is a continuation-in-part of our application Ser. No. 09/861,906, now U.S. Pat. No. 6,764,615, filed May 21, 2001, entitled "MIGRATING CORROSION INHIBITOR FIBERS" and assigned to the same assignee as the present application.

BACKGROUND OF THE INVENTION

The present invention relates generally to an improved composition and method for repairing metal reinforced concrete structures, and more particularly to such a composition and method specifically adapted for application as a slurry or other workable blend to surfaces of damaged concrete structures containing metal reinforcements. The composition of the present invention employs a mortar/aggregate and fiber reinforcements mixture containing a quantity of migratory corrosion inhibitors. The mixture is particularly adapted for repairing the surfaces of concrete structures, while at the same time for use in passivating and otherwise protecting the surfaces of metal reinforcements present in damaged concrete structures over extended periods of time. The environmentally friendly migratory corrosion inhibitors are preferably a mixture of sodium gluconate and an alkali metal sebacate such as sodium sebacate and/or potassium sebacate with ammonium benzoate being suitable as an alternate to the sebacate. In accordance with the present invention, the migratory corrosion inhibitors may be present from two sources, one source being the addition of the inhibitors to the mortar/aggregate blend, the second source being contained in an extruded reinforcing plastic fiber comprising a polymeric resin matrix into which a quantity of the migratory corrosion inhibitors set forth above has been co-extruded. It will be appreciated that the repair coatings of the present invention may be applied to a wide variety of structures involving various types of structures. Therefore, it may be appropriate to select an aggregate of relatively fine particulate material for certain applications, while utilizing somewhat coarser aggregates for other applications. Those of skill in the art will, of course, be able to select the appropriate aggregate for given applications.

The migratory corrosion inhibitors present in the improved formulation, preferably sodium gluconate and sodium sebacate are applied to a damaged surface area of a concrete structure as components of a fiber reinforced patch material, with the migratory corrosion inhibitors from either or both sources being released to the concrete structure over a relatively extended period of time. The formulation is suited for application in slurry or suspension form either directly by utilizing a trowel and normal rendering tools or with a spray rendering machine.

The overall composition is typically prepared in separate containers or vessels as a two-component system, the first of the two components consisting of a ready-mix powder comprising the mortar mix and co-extruded fiber reinforcement, the second being a liquid resin in the form of a water dispersion of non-toxic polymers or plasticizers and containing a quantity of the migratory corrosion inhibitors as set forth above. Prior to use, the contents of these two containers or vessels are mixed together to form the slurry or other workable suspension which is then ready for surface application.

Following application, the slurry hardens to form a durable fiber reinforced protective layer or coating which has excellent mechanical properties including a high level of adhesion, cohesion, durability and impermeability to water and carbonation attack. The coating also has a desirable low modulus of elasticity. In addition to these mechanical properties, the coating provides excellent corrosion protection to metal reinforcement present in the damaged concrete structure, thus providing protection in the patch area as well as in the area surrounding the patch. The compositions of the present invention accordingly increase the quality, enhance the appearance, and also extend the life of the damaged concrete structure, particularly at the repair site, as well as in the area immediately surrounding the site.

The migratory corrosion inhibitor molecules from either source evolve out of the body of the hardened coating as the coating and the concrete structure forming the substrate continue to age. While the inhibitors which have been incorporated directly into the blend may evolve rapidly, those incorporated as a component in the co-extruded fiber generally evolve at a less rapid rate. Regardless of their course of derivation, these molecules migrate through the porous channels of the concrete structure to provide ongoing protection to the metal reinforcements, such as, for example, steel rods, mesh, and cable. The inhibitors selected for the current application possess the characteristic of being able to migrate through cured concrete and onto and along the surfaces of the metallic members. The combination of the corrosion inhibitors when present in the surface coating deliver long-term corrosion protection to the structure while retarding the rate of corrosion on the steel reinforcements.

As indicated hereinabove, the second source of migratory corrosion inhibitors is an extruded fiber comprising a polymeric resin matrix into which a quantity of migratory corrosion inhibitors has been co-extruded. The co-extruded inhibitors preferably include sodium gluconate and sodium sebacate, although ammonium benzoate may be incorporated as an alternative to the sebacate component or gluconate component.

Thus, the composition and methods of the present invention provide a medium for both immediate as well as ongoing metallic surface protection through extended delivery of migratory corrosion inhibitors to and through damaged concrete surfaces. The features of the invention are achieved through the addition of these inhibitors directly to the mortar mix/fiber reinforced composition employed in the working formulation of the coating. The utilization of impregnated reinforcing fibers as either the primary or secondary source of migratory corrosion inhibitors provides an additional measure of extended long-term corrosion inhibitor availability.

The improved composition and method of application in accordance with the present invention offers engineers, property owners, contractors, DOTs and other governmental agencies a corrosion inhibiting technology adapted to extend the life of reinforced concrete structures. The composition and formulations of the present invention enable the artisan to undertake otherwise difficult repairs or restorations on substrates having smooth surfaces and to which good adhesion is normally difficult if not impossible to achieve. Such repairs are also rendered possible where high build-up or thick coatings may otherwise be required.

Because of the nature of the improved compositions, the coatings may normally be applied to surfaces without requiring that the repair area initially soaked with water or otherwise be rendered wet. Furthermore, the thixotropic qualities of the improved composition along with its accelerated thickening capabilities enable application of multiple coats, thereby reducing labor costs.

Because of the physical and chemical nature of the migratory corrosion inhibitors present in the formulations, these inhibitors form a protective layer or deposit directly onto metallic surfaces. In addition to those areas which are in direct contact with the coating, the migratory properties of the inhibitors extend protection to metallic surfaces surrounding or otherwise adjacent the repair area. In addition to protection afforded the metallic components, the mechanical properties of the fiber reinforced coating, when hardened, protects the surface of the concrete repair area against further carbonation or attacks by chlorides and/or acid rain.

Given the advantageous features of the composition and method of application, the working formulations of the present invention may be utilized in combination with reinforced, precast, pre-stressed, post-tensioned or marine concrete structures. Such structures include, by way of example, steel-reinforced concrete bridges, highways, streets, parking decks, ramps, and garages exposed to corrosive environments such as carbonation, deicing salts, and possible atmospheric attack. The excellent water resistant properties of the hardened or set material permit its application to concrete piers, piles, pillars, pipes and utility poles, and in general may be utilized to restore and repair virtually any type of reinforced concrete, commercial and/or civil engineered structures.

SUMMARY OF THE INVENTION

In accordance with the present invention, the environmentally suitable corrosion inhibitors utilized are preferably a 50:50 blend of sodium gluconate and the alkali metal salt of a fatty acid, namely sodium or potassium sebacate. The sebacate is preferably sodium sebacate. The preferred sodium gluconate is that gluconate which is obtained from the processing of sugar beets, with this material having unique properties which have been found to enhance its ability to migrate from the repair coating to the rebar on and under the substrate surface. Such gluconates, in combination with the sodium salt of sebasic acid, has been found to effectively control and in some cases prevent oxidation of embedded rebar for extended periods of time. The system of the present invention facilitates the delivery of corrosion protection to the rebar. The compositions and methods of the present invention may be advantageously employed in applications where the surface to be repaired has been pre-exposed to an aqueous solution of substantially equal portions of sodium sebacate and sodium gluconate. Such a solution may be applied to the surface and permitted to soak into the substrate, with the application of the aqueous solution being immediately followed by application of coatings prepared pursuant to the present invention.

As reinforced concrete structures age, oxidation of the metallic reinforcement results in a dimensional change or swelling of the metallic member which in turn requires expansion space for the reinforcement. That expansion adversely affects the quality or integrity of concrete surrounding the reinforcement, resulting in cracking and/or crumbling, and with repairs then becoming necessary. The features of the present invention include the addition of inhibitors to the repair system which effectively retard the oxidation and accompanying swelling of the metal surfaces and accordingly provide a means of achieving a long-term repair with application of a single coating repair product. The presence of the migratory corrosion inhibitors in the repair coating formulations of the present invention substantially retard further oxidation, with the coating thereby becoming resistant to damage created by ongoing rebar oxidation and expansion.

Although others are suitable, the mortar utilized in accordance with the present invention is typically that composition with the chief ingredients being cement and lime. Other additives including silica, sulfur, and sodium or potassium silicate may also be present. Such mortars are, of course, widely commercially available.

Therefore, it is a primary object of the present invention to provide an improved concrete repair coating which incorporates migratory corrosion inhibitors for extended protection of steel reinforcements used in concrete structures, wherein the repair coating includes corrosion inhibitors blended into a mortar mix and also incorporated into fiber reinforcements.

It is a further object of the present invention to provide an improved coating for concrete repair utilizing migratory corrosion inhibitors which are blended with a mortar/aggregate mixture and co-extruded into fiber reinforcements, with the blended inhibitors being primarily a 50:50 blend of an alkali metal sebacate selected from the group consisting of sodium gluconate and potassium gluconate.

Other and further objects of the present invention will become apparent to those skilled in the art upon a study of the following specification and appended claims.

DESCRIPTION OF THE PREFERRED EMBODIMENT

Migratory corrosion inhibitors were blended with a mortar/aggregate mixture pursuant to the following procedure:

EXAMPLE 1

| Component | Parts by Weight |
|---|---|
| Mortar | 50 |
| Aggregate | 50 |
| Sodium gluconate | 1.3 |
| Sodium sebacate | 1.3 |
| Polypropylene fiber from Fiber Preparation-Example A below | 2.0. |

The mortar/aggrefate/reinforcement fiber mixture is typically retained in a first container or pouch, while the sodium gluconate and sodium sebacate are present in an aqueous solution containing these corrosion inhibitors. These components are typically mixed together shortly before use, and applied soon thereafter, consistent with the pot life set forth hereinbelow.

Similar results are obtained with fibers from Fiber Preparation—Example B.

EXAMPLE 2

| Component | Parts by Weight |
|---|---|
| Mortar | 70 |
| Aggregate | 30 |
| Sodium gluconate | 1 |
| Sodium sebacate | 1 |
| Polypropylene fiber from Fiber Preparation-Example B below | 10. |

The materials present in this working Example 2 are also packaged in a two-component system and blended and utilized consistent with the steps in Example 1.

EXAMPLE 3

| Component | Parts by Weight |
| --- | --- |
| Mortar | 30 |
| Aggregate | 70 |
| Sodium gluconate | 1 |
| Sodium sebacate | 1 |
| Polypropylene fiber from Fiber Preparation-Example C below | 2.0. |

The materials present in this working Example 3 are also packaged in a two-component system and blended and utilized consistent with the steps in Example 1. Similar results are obtained with fibers from Fiber Preparation-Example C.

EXAMPLE 4

| Component | Parts by Weight |
| --- | --- |
| Mortar | 50 |
| Aggregate | 50 |
| Sodium gluconate | 0.3 |
| Sodium sebacate | 0.3 |
| Polypropylene fiber from Fiber Preparation-Example A below | 2.5. |

The materials present in this working Example 4 are also packaged in a two-component system and blended and utilized consistent with the steps in Example 1.

EXAMPLE 5

| Component | Parts by Weight |
| --- | --- |
| Mortar | 50 |
| Aggregate | 50 |
| Sodium gluconate | 1 |
| Ammonium benzoate | 1 |
| Polypropylene fiber from Fiber Preparation-Example B below | 2.0. |

The materials present in this working Example 5 are also packaged in a two-component system and blended and utilized consistent with the steps in Example 1.

EXAMPLE 6

| Component | Parts by Weight |
| --- | --- |
| Mortar | 30 |
| Aggregate | 70 |
| Sodium gluconate | 0.5 |
| Ammonium benzoate | 0.5 |
| Polypropylene fiber from Fiber Preparation-Example B below | 2. |

The materials present in this working Example 6 are also packaged in a two-component system and blended and utilized consistent with the steps in Example 1.

EXAMPLE 7

| Component | Parts by Weight |
| --- | --- |
| Mortar | 70 |
| Aggregate | 30 |
| Sodium gluconate | 1 |
| Ammonium benzoate | 1 |
| Polypropylene fiber from Fiber Preparation-Example A below | 2. |

The materials present in this working Example 7 are also packaged in a two-component system and blended and utilized consistent with the steps in Example 1.

Reinforcement Fibers

A second source of migratory corrosion inhibitors is employed, with the inhibitors being contained within a polymeric resin matrix and preferably co-extruded within a polyolefin such as polypropylene or polyethylene. Polypropylene is generally preferred and selected for most applications. In this connection, the co-extruded component is preferably a 50:50 blend of sodium gluconate together with an inhibitor selected from the group consisting of sodium sebacate, potassium sebacate, and ammonium benzoate. U.S. Pat. No. 6,054,512, assigned to the same assignee as the present invention, describes certain techniques for incorporation of corrosion inhibitors in a polymeric resin. It has been found that fibers prepared in accordance with the present invention are well adapted to the two-step process including preparation of a masterbatch containing approximately 50% migratory corrosion inhibitors, with the masterbatch being subsequently extended through incorporation of additional raw resin, or being used to produce fibers containing 50% migratory corrosion inhibitors.

Fiber Preparation—Example A

A total of 50 parts by weight of polypropylene and 50 parts by weight of a 50:50 blend of sodium gluconate and sodium sebacate were fed into a vented extruder. Barrel temperatures ranged from 250° F. to 270° F. The extrudate was cooled and processed to a flat film with a thickness of about 10 mils. This sheet stock was slit and chopped into one-inch fibers and incorporated into the mix to create a coating for damaged concrete and also to serve as a source of migratory corrosion inhibitor that provides long-term corrosion protection to the steel rebar reinforcement.

As an alternative, the sheet stock of Example A was slit and chopped into one-half inch fibers with satisfactory results. Fibers of up to two inches in length may also be employed.

Fiber Preparation—Example B

Monofilament fibers were prepared by extruding polypropylene resin mixed with a 50% migratory corrosion inhibitor of polypropylene masterbatch into monofilamentary form having a denier of about 6 to 15 utilizing the fiber preparation technique of Example A above. These filaments were then elongated to 200% and chopped to a length of approximately 1.5 inches. Such filaments were effective as a reinforcement especially useful in concrete repair.

Fiber Preparation—Example C

The polypropylene of Example B was blended and extruded in accordance with Example B to form a sheet stock film having a thickness of 10 mils. Fibers were prepared from the sheet stock film by chopping into a length of one inch.

Fiber Usage

The co-extruded fibers prepared in accordance with Fiber Preparation Examples A–C hereinabove are intended for use in connection with the formulations of Examples 1–7. The polypropylene and/or polyethylene material employed is preferably virgin material, it being understood that for certain limited applications, post-consumer recycled polyethylene or polypropylene may also be employed. Polyethylene may be suitably substituted for the polypropylene components in each of the examples set forth above, it being noted, however, that polypropylene is the preferred material for fiber reinforcement.

Conventional use of the fibers of the present invention is to add between about 0.6% and 3% by weight of fiber per 100 pounds of mortar/aggregate mixture. The extended term of corrosion protection provided for the concrete reinforcements present in the concrete structure being repaired is provided by the emission and migration of the migratory corrosion inhibitor from the co-extruded fibers.

Migratory Corrosion Inhibitor Formulation

A preferred working formulation of migratory corrosion inhibitors was prepared from the following blend:

| Component | Parts by Weight |
| --- | --- |
| Sodium gluconate derived from sugar beet extract | 50 parts |
| Sodium sebacate | 50 parts. |

Similar formulations of migratory corrosion inhibitors may be prepared utilizing potassium sebacate or ammonium benzoate in place of the sodium sebacate of this formulation. These inhibitors are preferably added in substantially equal quantities, although variations may be made wherein the ratio of sodium gluconate is varied from between about 40% to 70% by weight, balance sodium sebacate, potassium sebacate, or ammonium benzoate. While sodium sebacate is the preferred salt of a fatty acid, potassium sebacate may be employed as a substitute for sodium sebacate with satisfactory results.

Incorporation into a Working Concrete Repair Coating

In a typical mix and in accordance with Examples 1–7 hereinabove, the mortar/aggregate mixture is blended with the fiber reinforcement, with this forming one component of the two-component repair system. The migratory corrosion inhibitors are added in an aqueous dispersion with those non-toxic polymers as indicated hereinabove being incorporated into the aqueous component as well. In other words, the first source migratory corrosion inhibitors are held separate from the mortar/aggregate/fiber mix and are preferably incorporated in a water dispersion, with an acrylic polymer such as "EPS Forton" which is commercially available from Engineered Plastics Corp. of Marengo, Ill. in an amount ranging from between about 0% (wgt) and 70% (wgt) polymer in water, with 5% to 25% by weight of polymer being preferred. After this dispersion has been mixed with the mortar/aggregate/fiber components, it is applied to the surface of the damaged concrete by trowel, normal rendering tools, and/or a spray rendering machine. Obviously for certain applications where larger quantities of repair coating are contemplated, the requisite quantities may be blended at the site. The two-component kit described hereinabove remains well suited for a wide variety of applications with water added as needed.

Typical coverage rates are as follows:

A 55-pound (25 kg) bag of powder and a 9.4 pound (4.3 kg) can of liquid will cover a 150-square foot ($14^2$ m) at a thickness of 39 mils (1 mm). This quantity yields approximately 0.5 $foot^3$ of raw coating material.

Although the formulations typically demonstrate good adhesion properties, on those surfaces that may provide poor surface bonding, the surface may be treated prior to application of the repair coating by brushing the surface with a thin slurry or suspension of the mortar using a stiff bristled brush. Working formulations of the present invention may be applied in thicknesses of up to about 2.5 inches, and if the repair area requires greater thicknesses, the working formulation should be installed in several layered applications up to a maximum thickness of approximately 12 inches. In certain thick applications on large surfaces, it may be desirable to employ a wire mesh or netting to anchor the repair structure for additional support. Working formulations of the present invention, because of their thixotropic nature, tend to thicken quickly.

SUMMARY

The present invention provides an environmentally friendly concrete and mortar repair system which incorporates migratory corrosion inhibitors for enhancing the quality and anticipated lifetime of surface repairs to concrete structures.

It will be appreciated that the specific examples provided herein are for purposes of illustration only and are not to be otherwise construed as a limitation upon which the invention would otherwise be entitled.

What is claimed is:

1. The method of repairing metal reinforced concrete structures comprising the steps of preparing a first blend comprising a mortar and aggregate mixture, plastic resinous fiber reinforcement, and migratory corrosion inhibitors, and applying a layer of the first blend to surfaces of damaged metal reinforced concrete structures, wherein:

(a) said mortar/aggregate mixture contains from between about 30% to 60% by weight mortar, balance aggregate;

(b) said migratory corrosion inhibitors have a first source and a second source, with said first source of migratory corrosion inhibitor consisting of a second blend comprising between about 20% and 60% by weight sodium gluconate, balance an auxiliary corrosion inhibitor selected from the group consisting of sodium sebacate, potassium sebacate and ammonium benzoate;

(c) said first source of migratory corrosion inhibitor is present in said first blend in an amount from between about 0.6% and 2.6% by weight of said mortar/aggregate mixture;

(d) said second source of migratory corrosion inhibitor consists of an in-situ co-extruded formulation of a migratory corrosion inhibitor comprising sodium gluconate and an auxiliary corrosion inhibitor selected from the group consisting of sodium sebacate, potassium sebacate and ammonium benzoate, said migratory corrosion inhibitor formulation being retained within a polymeric resin fiber matrix, and wherein said in-situ migratory corrosion inhibitor is characterized in that:
(1) said sodium gluconate and the auxiliary migratory corrosion inhibitors are present in said migratory corrosion inhibitor formulation in substantially equal quantities by weight;
(2) said migratory corrosion inhibitor formulation is present in said polymeric resin fiber matrix at a concentration of between about 10 and 30 parts by weight, and said polymeric resin being present in said polymeric resin fiber matrix at a concentration of between about 70 and 90 parts by weight; and
(3) wherein said co-extruded fiber is present in said first blend in an amount of between about 1% and 3% by weight of said mortar/aggregate mixture.

2. The method as defined in claim 1 wherein said polymeric resin is a polyolefin resin selected from the group consisting of polyethylene and polypropylene.

3. A mortar/aggregate mixture blended with plastic resinous fiber reinforcement and migratory corrosion inhibitors for preparation of a working aqueous slurry and comprising:
(a) a mortar/aggregate mixture containing from between about 20% to 60% by weight mortar, balance aggregate;
(b) a first migratory corrosion inhibitor consisting of a blend of between about 20% and 80% by weight sodium gluconate, balance an inhibitor selected from the group consisting of sodium sebacate, potassium sebacate and ammonium benzoate and with said first migratory corrosion inhibitor being present in said slurry in an amount ranging from between about 0.6% and 2.6% by weight of said mortar/aggregate mixture;
(c) said plastic resinous fiber reinforcement consisting of a plastic resin substrate and an in-situ co-extruded second migratory corrosion inhibitor and wherein:
(i) said plastic resin substrate is a polyolefin selected from the group consisting of polyethylene and polypropylene, and wherein:
(ii) said second migratory corrosion inhibitor consists of a 50:50 blend of sodium gluconate and an inhibitor selected from the group consisting of sodium sebacate, potassium sebacate and ammonium benzoate, with said second migratory corrosion inhibitor being present in said plastic resinous fiber reinforcement at a concentration of between about 10 and 30 parts by weight, and said plastic resin substrate being present in said plastic resinous fiber reinforcement at a concentration of between about 70 and 90 parts by weight; and
(iii) said second migratory corrosion inhibitor being co-extruded with said plastic resin substrate into a plastic resinous fiber reinforcement form; and
(d) said plastic resinous fiber reinforcement being present in said slurry in an amount of between about 1% and 3% by weight.

\* \* \* \* \*